May 21, 1957 B. A. WHEELER 2,793,028
CROSS-SPRING FLEXURE PIVOT

Filed Sept. 10, 1954 2 Sheets-Sheet 1

INVENTOR.
BRYCE A. WHEELER,
BY
Henry Heyman
ATTORNEY.

May 21, 1957 B. A. WHEELER 2,793,028
CROSS-SPRING FLEXURE PIVOT
Filed Sept. 10, 1954 2 Sheets-Sheet 2
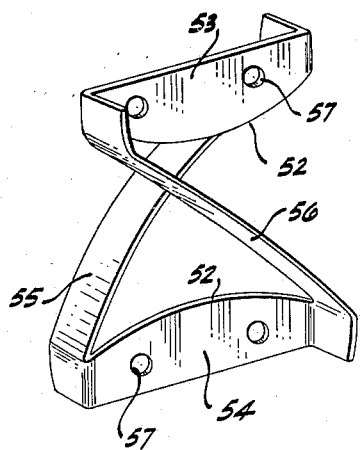
FIG. 7.
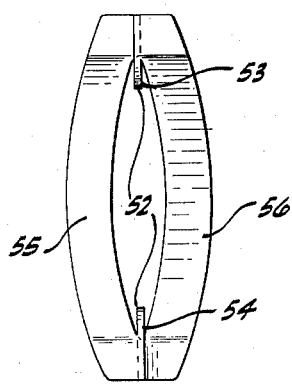
FIG. 8.
FIG. 9.
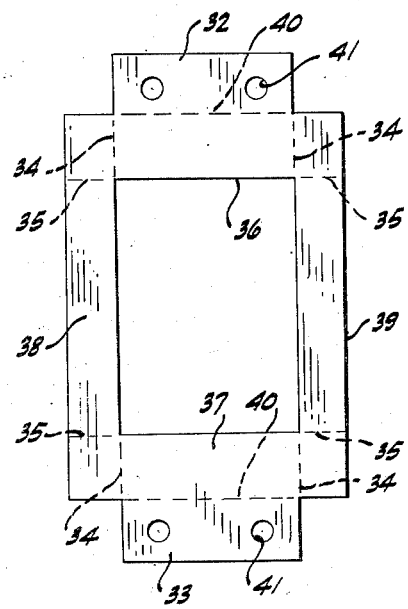
FIG. 10.
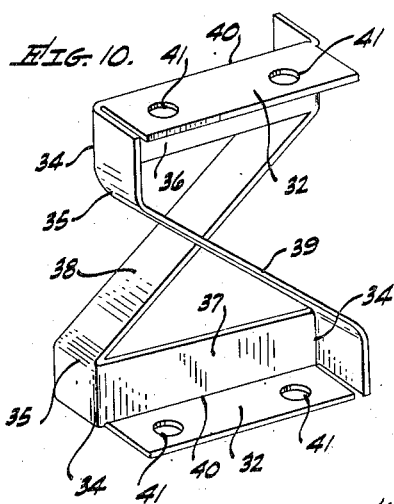
INVENTOR.
BRYCE A. WHEELER,
BY
Henry Heyman
ATTORNEY.

United States Patent Office 2,793,028
Patented May 21, 1957

2,793,028

CROSS-SPRING FLEXURE PIVOT

Bryce A. Wheeler, Los Angeles, Calif., assignor to Hughes Aircraft Company, Culver City, Calif., a corporation of Delaware Application September 10, 1954, Serial No. 455,138

7 Claims. (Cl. 267—1)

This invention relates to flexible mounting devices in general, and more particularly to a cross-spring flexure pivot and a method of forming the same.

In many applications it is necessary to provide a means for spring mounting a first body with respect to a second body in such manner that the motion between the two bodies is restricted to a single degree of freedom to allow only arcuate motion of the first body about a substantially fixed point. For example, in torque sensing devices it is often necessary to confine a body which is subjected to torque forces to an arcuate movement by means of a calibrated rate spring which may be used to measure the torque. Similarly in many gyroscopic mechanisms, it is necessary to confine the movement of the gyroscope to spring resisted arcuate movement about a substantially fixed point.

Accordingly, it is an object of the present invention to provide a spring-mounting device which is rigid in all directions except a planar arcuate direction which is spring resisted.

It is another object of the present invention to provide a means for spring mounting a first body with respect to a second body which will confine the relative motion of the bodies to arcuate movement about a fixed point.

It is a further object of the present invention to provide a unitary cross-spring flexure pivot which will confine a first body mounted thereon to planar arcuate movement with respect to a second body mounted thereon.

It is a still further object of the present invention to provide a method of forming a cross-spring flexure pivot, of unitary construction from spring material, which positions the grain of the metal for proper flexure.

It is a still further object of the present invention to provide a unitary flexure spring mounting device which is capable of a wide range of planar arcuate movement without permanent distortion of the flexure members.

These and other objects and advantages of the present invention will be apparent to those skilled in the art from the following description of a presently preferred embodiment illustrated in the accompanying drawings hereby made a part of this specification in which:

Fig. 7 is a perspective view of a modified unitary cross-spring flexure pivot as developed from the pre-formed sheet shown in Fig. 6;

Fig. 8 is an end view of the flexure pivot shown in Fig. 7;

Fig. 9 is a modified form of pre-formed sheet for use in constructing a flexure pivot that is adapted for horizontal mounting; and Fig. 10 is a perspective view showing the flexure pivot developed from the pre-formed sheet shown in Fig. 9.

The device of the present invention utilizes flexure cross supports diagonally and symmetrically affixed to two normally parallel bodies which are to be spring mounted. The method of forming a unitary cross-spring flexure pivot utilizes the rotation through 180° of one end of a pre-formed flat, hollow form of spring material having parallel ends and substantially parallel or convex sides.

Figure 1:
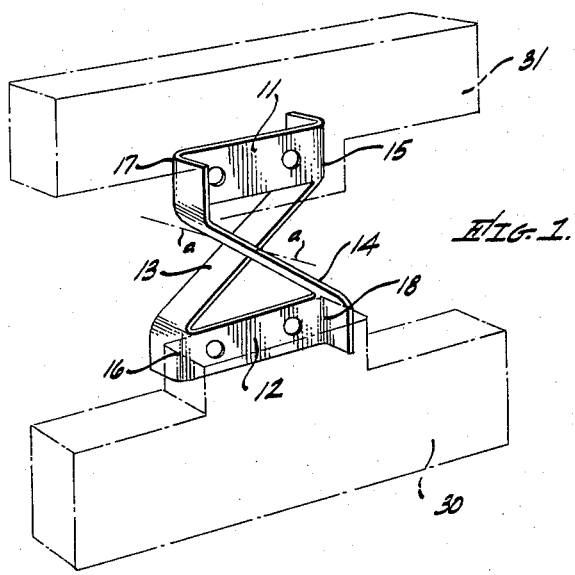
Fig. 1 is a perspective view of a presently preferred embodiment of a unitary cross-spring flexure pivot having two flexing elements, representatively illustrated as adapted for use in accordance with the present invention.
Figure 3:
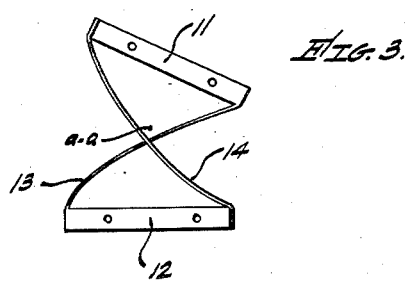
Fig. 3 is a diagrammatic representation of the cross-spring flexure pivot of Fig. 1 in a flexed position.

Referring to the drawings, similar reference numerals refer to like parts throughout the several views. Referring now particularly to Figs. 1 and 3, a presently preferred embodiment of the present invention having two crossbar flexures is shown. A movable mounting member 11 is parallel to, and oriented in a common plane with, the mounting base 12 which is equal in length to the movable member 11 in the illustrative embodiment. Flexing crossbars 13, 14 of equal length are affixed to diagonally opposed ends of the movable member 11 and base 12. The first flexing crossbar is, therefore, affixed to the end 15 of the movable member 11 and the diagonally opposed end 16 of the base 12, and is positioned normal to, and to one side of, the plane which is common to the movable member 11 and base 12. The second flexing crossbar 14 is affixed to the end 17 of the movable member 11 and the diagonally opposed end 18 of the base 12, and is positioned normal to the common plane of the movable member and base, and to the side of the plane which is opposite from that in which the first flexing crossbar 13 is positioned. Thus, the spring mounting device of the present invention assumes the symmetrical configuration of the figure X with closed ends and a line of intersection a—a (Fig. 1) normal to the common plane of the movable member 11 and base 12.

As a force is applied having a vector acting as a torque force on the movable mounting member 11, the cross-spring flexure pivot of the present invention will deflect as shown in Fig. 3. Thus, with the base 12 stationary and a torque force applied to the movable member 11, the movable member will move in a planar arc having its center of rotation in the plane of the movable member and base, and on the line of intersection a—a of the crossbars in an unflexed position. As the movable member is rotated, the line of intersection of the flexing crossbars will be laterally displaced. However, the rotation of the movable member will still have its center of rotation on the original line of intersection a—a of the crossbars indicated as point a—a in Fig. 3. The movable member and any body affixed thereto is, therefore, constrained to move only in a circular arc having its center of rotation at a point in the plane of the base and movable member on the line of intersection of the flexing crossbars at their original or unflexed position. Rotation about this fixed point will occur regardless of the angle at which the flexing crossbars intersect.

Thus, in flexing, both crossbars are concave in the same direction and are flexed throughout their length, thereby forming no permanent distortion throughout the flexing components of the spring mount. When metallic spring material is used, as in the presently preferred embodiment, the grain of the metal should run in the longitudinal direction of the flexing crossbars.

Figure 2:
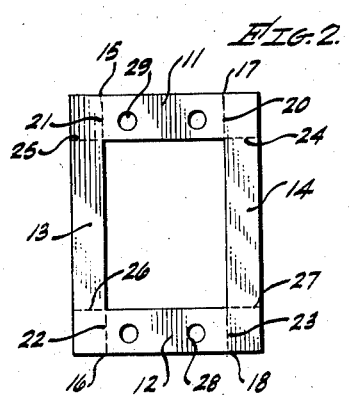
Fig. 2 is a plan view of a pre-formed sheet of spring material fabricated in accordance with the present invention.

Referring now particularly to Figs. 1 and 2, a method of forming a cross-spring flexure pivot, in accordance with the present invention, will be described in conjunction with a presently preferred embodiment of a two element flexure pivot, as shown in Fig. 1. A sheet of spring material is stamped or otherwise pre-formed to form a hollow rectangle, as shown in Fig. 2. The inside length of the hollow rectangle will determine the length of the flexing crossbars 13, 14, while the inside width of the hollow rectangle will determine the length of the mounting base 12 and movable mounting member 11. In a typical embodiment, to obtain the cross-spring flexure pivot shown in Fig. 1, the pre-formed rectangle of Fig. 2 is stamped from a sheet of 1095 carbon steel about 0.016 inch in thickness. The ratio of the inside length of the sides of the rectangle to the ends of the rectangle is determined by the desired dimensions of the finished spring, but in a typical embodiment, for purpose of illustration, is 4 to 3. The grain of the metal should run in the direction of the length of the rectangle in order that the grain of the metal in the flexing crossbars in the finished spring runs in the direction of flexing. The width of the ends of the rectangle is equal to the desired width of the mounting member and base, while the width of the sides is equal to the desired width of the crossbars. The width of the crossbars may be varied and will be determined by the strength and rigidity desired in the finished spring mount.

In forming the spring of Fig. 1 from the pre-formed spring material of Fig. 2, the metal is folded while one end of the rectangle is rotated through 180° with respect to the opposed end of the rectangle. The end 11, which will be the movable member 11 in the finished spring, and the end 12 are maintained straight while all folding and permanent distortion of the metal takes place along the lines shown dotted in Fig. 2. In forming the cross-spring flexure pivot from the flat spring metal form, the end 11 is rotated through 180° while the metal is bent along bending line 20, with a minimum radius, normal to the surface of end 11. The rectangle is similarly bent along bending line 21 normal to the surface of end 11, but in the direction opposed to the bend made along bending line 20 with respect to the surface of end 11. The metal form is also bent along bending line 22 with a minimum radius, normal to the surface of end 12 in the same direction as the bend made along bending line 20 with respect to the surface of end 11 in the flat form of the pre-formed rectangle. The rectangle is similarly bent along bending line 23 normal to the surface of end 12, but in the direction opposed to the bend made along bending line 22 and in the same direction as the bend made along bending line 21, with respect to the surface of end 11 in its original non-rotated position. Thus, if the end 12 is held stationary, the end 11 of the rectangle is rotated through 180°, returning the end 11 to the plane of end 12, while the flexing crossbars become oriented in intersecting planes on opposed sides of the plane common to the ends 11, 12. The flexing crossbars are thereby affixed and permanently bent through less than 90° along bending lines 24, 25, 26, 27. Mounting holes 28, 29 are provided through the base 12 and movable member 11 by stamping or drilling mounting holes through the ends of the pre-formed rectangle.

Thus, a presently preferred embodiment of the present invention, formed as described hereinbefore, may be mounted in operation as shown in Fig. 1. The cross-spring flexure pivot is affixed to a stationary body 30, shown by dotted lines, by means of the mounting holes 28. The movable body 31, also shown by dotted lines, is affixed to the movable mounting member 11 by means of the mounting holes 29. The movable body is parallel to the stationary body and will be constrained to arcuate motion about a fixed point as described hereinbefore. For mounting the cross-spring flexure pivot on horizontal surfaces, a modification of the pre-formed shape shown in Fig. 2 would be as shown in Figs. 9 and 10. In this modification, a blank, as shown in Fig. 9, is formed similarly to the blank shown in Fig. 2 and provided with extension tabs 32 and 33 which have ends positioned coextensive with bending lines 34 which in turn extend longitudinally of the blank. The blank of Fig. 9 is also provided with laterally extending bending lines 35, end members 36 and 37 and side members 38 and 39, the side members ultimately becoming flexing crossbars when the blank is folded as indicated in Fig. 10. Bending lines 40, between the extension tabs 32 and the end members 36 and 37 define 90° corners from which the extensions 32 are positioned relative to the end members 36 and 37. The extension tabs 32 and 33 are further provided with mounting holes 41 in order that the cross-spring flexure pivot of this modification may be mounted in a horizontal manner relative to adjacently disposed stationary and movable bodies.

Figure 4:
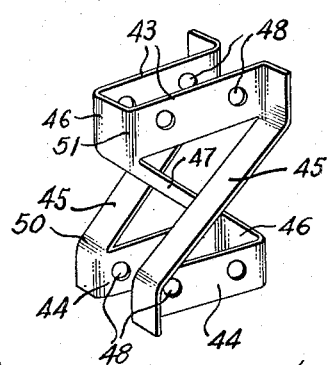
Fig. 4 is a modification of the present invention showing a presently preferred spring structure having a three element cross-spring structure.
Figure 5:
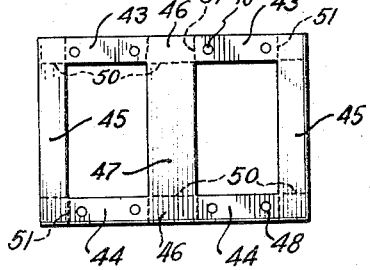
Fig. 5 is a plan view of a pre-formed sheet of spring material fabricated in accordance with the present invention to form a unitary cross-spring flexure pivot having three flexing elements as shown in Fig. 4.

The cross-spring flexure pivot of this invention may be pre-formed and constructed to utilize any number of flexing crossbars for specific loads or rigidity. A typical embodiment of a three element cross-spring flexure pivot, i. e., one having three flexing crossbars is shown in Fig. 4, and the pre-formed configuration for forming the cross-spring flexure pivot of Fig. 4, in accordance with this invention, is shown by Fig. 5. It may be seen that the pre-formed configuration for forming embodiments of this invention having crossbars in excess of two consists of adjoining hollow rectangles similar to that hereinbefore described and shown in Fig. 2, but having common sides equal to twice the width of the outside sides of the adjoining rectangles. Thus, equal flexibility is achieved in both arcuate directions in the formed spring mount. With specific reference to Figs. 4 and 5, this cross-spring flexure pivot includes a pair of movable mounting members 43 that are arranged in parallel relationship, and a similarly disposed pair of mounting base members 44. Flexing crossbars 45 are disposed between free ends of each of the pair of members 43 and 44, with the others of the ends of the mounting members being integrally connected by means connecting portions 46. The portions 46 have a relatively wide flexing crossbar 47 disposed therebetween and integral therewith. In addition, the mounting members 43 and 44 are each provided with a pair of mounting holes 48. The blank for the flexure pivot of Fig. 4 is shown in detail in Fig. 5 with the crossbars 45 and 47 being bent along bending lines 50 and the mounting members 43 and 44 being bent along bending lines 51 in much the same manner as described hereinbefore in connection with the form of the invention shown in Figs. 1, 2 and 3, with the exception that the pair of crossbars 45 are disposed in the same direction, while the relatively wide crossbar 47 is disposed in an opposite direction.

Figure 6:
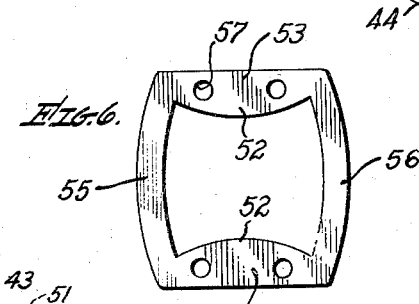
Fig. 6 is a modification of the pre-formed sheet of spring material illustrated by Fig. 2.

A further modification of the pre-formed hollow rectangle of Fig. 2 is illustrated in Figs. 6, 7 and 8. In this embodiment, additional mounting surface is obtained for mounting the bodies by expanding the inside edges 52 of the ends 53 and 54 of the preformed configuration. In addition, the sides 55 and 56 of the pre-formed configuration are non-linear, being symmetrically curved convexly to the longitudinal centerline of the pre-formed flat form. Thus, after bending in the manner herein described in connection with the form of the invention shown in Figs. 1, 2 and 3, the flexing crossbars will be farther apart along their line of intersection than at their ends, thereby exerting additional resistance to any force tending to rotate the movable member out of the plane of the base. The particular configuration of the form of the invention shown in Figs. 6, 7 and 8 and the relationship of the crossbars 55 and 56 is shown in more detail in Fig. 8 and the bent configuration of the completed pivot is shown in Fig. 7. In addition, this modified structure is provided with mounting holes 57 in the end portions 53 and 54 in order that this flexure pivot may be mounted in much the same manner as shown in Fig. 1.

While presently preferred embodiments of the invention have been described with some particularity, it is to be understood that these are given by way of example only. Many modifications and applications of the device of the present invention will be apparent to those skilled in the art, and the invention therefore is to be determined by the objects and appended claims.

What is claimed is:

1. A cross-spring flexure pivot comprising a first flexing crossbar, a second flexing crossbar, and a member movable with respect to a stationary base, said first flexing crossbar being affixed at a first connecting point on said movable member and a first connecting point on said base, said second flexing crossbar being affixed at a second connecting point on said movable member and a second connecting point on said base, said four connecting points lying in a common plane, said first and second connecting points on said movable member parallel to said first and second connecting points on said base, said four connecting points being symmetrical about an axis perpendicularly bisecting a line between the first and second connecting points on said base; said first flexible crossbar being affixed to said movable member and base at diagonally opposed first connecting points and positioned at one side of said plane common to said four connecting points; and said second flexing crossbar being affixed at diagonally opposed second connecting points to the opposed side of said plane, whereby said movable member is constrained to move only in a planar arcuate motion with respect to said base.

2. A cross-spring flexure pivot comprising a rigid mounting base, a rigid mounting member movable with respect to said base, a first flexing crossbar, and a second flexing crossbar; said movable member being parallel to, and disposed from, said base; said first flexing crossbar being affixed at a first connecting point on said movable member and a first connecting point on said base, said second flexing crossbar being affixed at a second connecting point on said movable member and a second connecting point on said base, said four connecting points lying in a common plane with said first and second connecting points on said movable member parallel to said first and second connecting points on said base, said four connecting points being symmetrical about an axis perpendicularly bisecting a line between said first and second connecting points on said base; said first flexing crossbar being affixed to said movable member and said base at diagonally opposed first connecting points and positioned to one side of said plane common to said four connecting points; said second flexing crossbar being affixed at diagonally opposed second connecting points to the opposed side of said plane, whereby a body mounted on said movable member is constrained to move only in a planar arcuate motion with respect to a body mounted on said base.

3. A unitary flexure pivot for constraining the relative motion between two bodies mounted thereon to planar arcuate movement comprising a rigid mounting base, a rigid mounting member movable with respect to said base, a first flexing crossbar, and a second flexing crossbar; said movable member having a surface in a plane common with said base, said movable member being disposed from and coextensive with said base; said first flexing crossbar affixed to diagonally opposed first ends of said movable member and said base and positioned to one side of said plane common to said movable member and said base; said second flexing crossbar being affixed to diagonally opposed second ends of said movable member and said base and to the side of said common plane opposed to said first flexing crossbar.

4. A unitary metallic flexure pivot for constraining the relative movement between two bodies mounted thereon to planar arcuate movement comprising a rigid mounting base, a rigid mounting member movable with respect to said base, a first flexing crossbar, and a second flexing corssbar; said movable member being equal in length to said base and positioned parallel to, and coextensive with, said base; said first flexing crossbar being affixed to diagonally opposed first ends of said movable member and said base, said first flexing crossbar being positioned to one side of the plane common to said movable member and base; said second flexing crossbar being affixed to diagonally opposed second ends of said movable member and said base, said second flexing crossbar being positioned to the side of said plane common to said movable member and said base opposed to said first flexing crossbar.

5. A unitary flexure pivot for constraining the relative motion between two bodies mounted thereon to planar arcuate movement comprising a rigid mounting base, a rigid mounting member movable with respect to said base, arcuately curved opposed edges on said mounting base and said mounting member, a first flexing crossbar, and a second flexing crossbar; said crossbars being arcuately curved, said movable member having a surface in a plane common with said base, said movable member being disposed from and coextensive with said base; said first flexing crossbar affixed to diagonally opposed first ends of said movable member and said base and positioned to one side of said plane common to said movable member and said base; said second flexing crossbar being affixed to diagonally opposed second ends of said movable member and said base and to the side of said common plane opposed to said first flexing crossbar.

6. A unitary flexure pivot for constraining the relative motion between two bodies mounted thereon to planar arcuate movement comprising a pair of rigid mounting bases, a pair of rigid mounting members movable with respect to said bases, a pair of first flexing crossbars, and a second flexing crossbar; said movable members having surfaces in planes common with said bases, the movable members being spaced from and coextensive with said bases; said first flexing crossbars affixed to diagonally opposed first ends of said movable members and said bases and outwardly from each other from sides of said planes common to said movable members and said bases; said second flexing crossbar being affixed to diagonally opposed second ends of said movable members and said bases and inwardly from sides of said common planes opposed to said first flexing crossbars.

7. A unitary flexure pivot for constraining the relative motion between two bodies mounted thereon to planar arcuate movement comprising a pair of rigid mounting bases, a pair of rigid mounting members movable with respect to said bases, a pair of first flexing crossbars of substantially equal width, and a second flexing crossbar; the movable members having surfaces in planes common with said bases, said movable members being spaced from and coextensive with said bases; said first flexing crossbars affixed to diagonally opposed first ends of said movable members and said bases and outwardly from each other from sides of said planes common to said movable members and said bases; said second flexing crossbar being affixed to diagonally opposed second ends of said movable members and said bases and inwardly from sides of said common planes opposed to said first flexing crossbars; said second crossbar having a width equal to substantially twice a width of one of said first crossbars.

References Cited in the file of this patent

UNITED STATES PATENTS

| | | |
|---|---|---|
| 392,617 | Lieb et al. | Nov. 13, 1888 |
| 445,007 | Russell | Jan. 20, 1891 |
| 2,676,224 | Stephenson | Apr. 20, 1954 |